US010185631B2

(12) United States Patent
Jewell

(10) Patent No.: US 10,185,631 B2
(45) Date of Patent: Jan. 22, 2019

(54) SYSTEM AND METHOD OF PERFORMING CONTINUOUS BACKUP OF A DATA FILE ON A COMPUTING DEVICE

(71) Applicant: Data Deposit Box Inc., Toronto (CA)

(72) Inventor: Timothy R. Jewell, Toronto (CA)

(73) Assignee: DATA DEPOSIT BOX INC., Toronto (CA)

( * ) Notice: Subject to any disclaimer, the term of this patent is extended or adjusted under 35 U.S.C. 154(b) by 757 days.

(21) Appl. No.: 14/324,112

(22) Filed: Jul. 4, 2014

(65) Prior Publication Data

US 2015/0012494 A1 Jan. 8, 2015

Related U.S. Application Data

(60) Provisional application No. 61/843,005, filed on Jul. 4, 2013.

(51) Int. Cl.
*G06F 17/00* (2006.01)
*G06F 11/14* (2006.01)

(52) U.S. Cl.
CPC ...... *G06F 11/1464* (2013.01); *G06F 11/1456* (2013.01); *G06F 11/1469* (2013.01); *G06F 11/1471* (2013.01)

(58) Field of Classification Search
CPC .................. G06F 11/1469; G06F 11/1471
USPC ........................................................ 707/784
See application file for complete search history.

(56) References Cited

U.S. PATENT DOCUMENTS

| | | | | |
|---|---|---|---|---|
| 5,157,663 A | * | 10/1992 | Major | G06F 11/1482 714/10 |
| 5,384,697 A | * | 1/1995 | Pascucci | G06F 9/465 700/10 |
| 5,799,305 A | * | 8/1998 | Bortvedt | G06F 9/466 |
| 6,088,694 A | * | 7/2000 | Burns | G06F 11/1451 |
| 7,558,926 B1 | | 7/2009 | Oliveira et al. | |
| 7,664,866 B2 | * | 2/2010 | Wakefield | H04L 63/104 707/781 |
| 7,783,604 B1 | | 8/2010 | Yueh | |
| 8,150,810 B1 | | 4/2012 | Ou et al. | |

(Continued)

FOREIGN PATENT DOCUMENTS

WO 2008/002802 1/2008
WO 2009/055174 4/2009

*Primary Examiner* — Eliyah S. Harper
(74) *Attorney, Agent, or Firm* — Bereskin & Parr LLP/S.E.N.C.R.L., s.r.l.; Isis E. Caulder; Nicholas Aitken

(57) ABSTRACT

The described embodiments relate to devices for performing continuous backup of a data file on a computing device. The computing device transmits, to a backup server, a first network backup version of the data file, when the backup server is constantly available to the computing device through an uninterrupted network connection. The computing device monitors the data file to detect when a modification has been made to the data file, and when a modification to the data file has been detected, the computing device refrains from transmitting backup data associated with the modification until a network time interval expires. During the network time interval, a delta file corresponding to the modification made to the data file is stored locally on the computing device. Upon expiry of the network time interval, the computing device then transmits a second network backup version of the data file to the backup server.

20 Claims, 10 Drawing Sheets

(56) References Cited

U.S. PATENT DOCUMENTS

Figure 1:
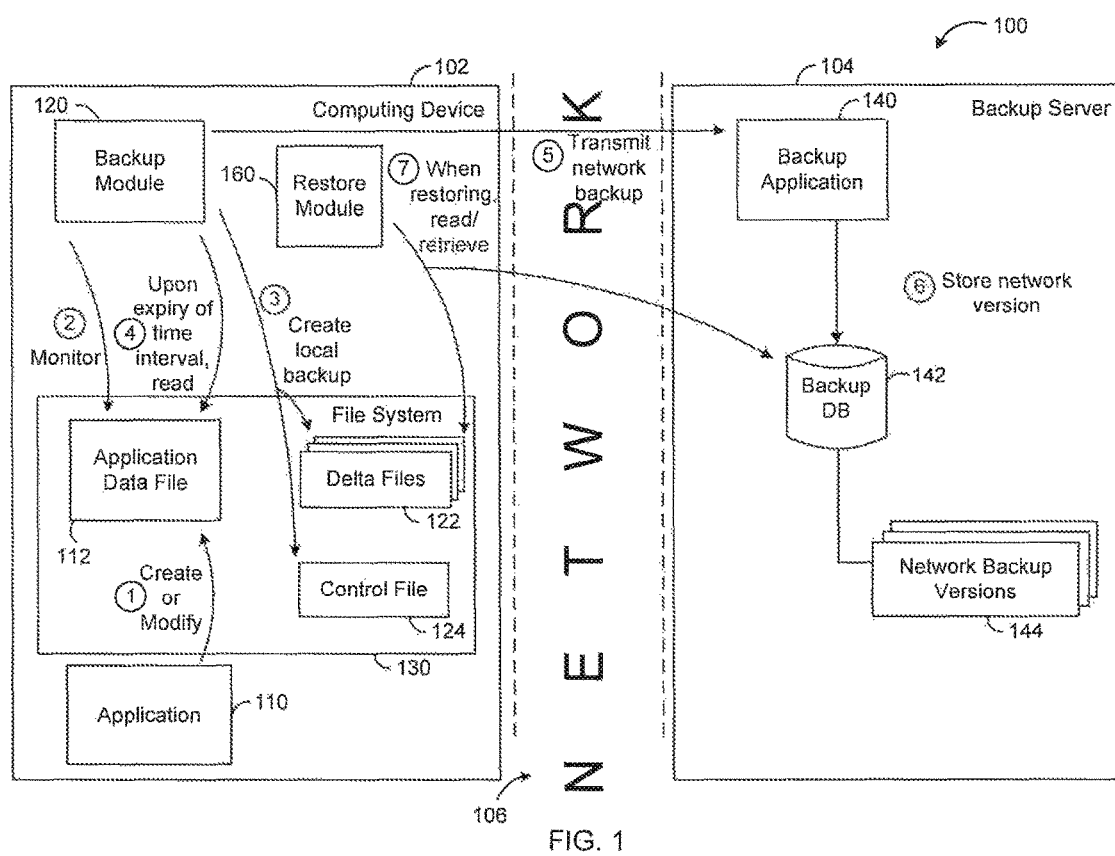

| | | | |
|---|---|---|---|
| 8,296,264 B1 | 10/2012 | Yeresov et al. | |
| 8,296,410 B1 | 10/2012 | Myhill et al. | |
| 8,352,430 B1 | 1/2013 | Myhill et al. | |
| 8,499,297 B2 * | 7/2013 | Chen | G06F 11/1438 718/1 |
| 8,782,085 B2 * | 7/2014 | Wakefield | H04L 29/12169 707/782 |
| 8,898,509 B2 * | 11/2014 | Mummidi | G06F 17/30289 714/4.11 |
| 2007/0294568 A1 * | 12/2007 | Kanda | G06F 11/1451 714/6.12 |
| 2012/0257571 A1 * | 10/2012 | Liao | H04W 4/005 370/328 |

* cited by examiner

← 122b

| 450 ↘ Delta File Data | |
|---|---|
| File name | File date |
| C_data.txt_1_090113Mar2013.dlt<br>─────  ↑  ─────<br>460b  470b  475b | 090113Mar2013<br>480b ↗ |

← 124b

| 405 ↘ Control File Data | |
|---|---|
| File name | File date |
| C_data.txt_1_090113Mar2013.clt<br>─────  ↑  ─────<br>410b  420b  430b | 080113Mar2013<br>440b ↗ |

FIG. 4

600

450 — Delta File Data

| File name | File date |
|---|---|
| C_data.txt_1_090113Mar2013.dlt<br>460b  470b  475b  — 122b | 090113Mar2013<br>480b |
| C_data.txt_1_100113Mar2013.dlt<br>460c  470c  475c  — 122c | 100113Mar2013<br>480c |
| C_data.txt_1_110113Mar2013.dlt<br>460d  470d  475d  — 122d | 110113Mar2013<br>480d |

FIG. 6

SYSTEM AND METHOD OF PERFORMING CONTINUOUS BACKUP OF A DATA FILE ON A COMPUTING DEVICE

FIELD

The described embodiments relate generally to systems and methods of performing data backup, and in particular, systems and methods of performing continuous backup of data on a computing device.

INTRODUCTION

Data backups generally involve copying and/or archiving computer data so that the data may be restored in the event of a data loss. The backup versions may be stored on a backup server to ensure that the data may be available for restoration (e.g., in the event of a hard drive failure, or if the computing device itself is lost).

Some traditional backup systems perform backups at regularly-scheduled time intervals. For example, the backup may be scheduled to occur at 2 am every day, so that a "snapshot" of the data at that particular time can be captured. Scheduled backup systems, however, fail to capture interim versions of a file that are created in between scheduled backups. For example, if data is backed up at 2 am, and modifications are made to the data at 10 am, the 10 am modifications will be lost if a hard drive failure occurs before the next scheduled backup.

To address this issue, some backup systems perform "continuous" data backup. Continuous backup systems monitor the data to be backed-up on a computing device. If a modification to the data is detected, the modified version of the data is transmitted to the backup server. Continuous backup systems, however, may consume large amounts of bandwidth because new versions of data are continually being transmitted to the backup server.

There is thus a need for an improved system for performing continuous backup of data.

SUMMARY

In one aspect, some embodiments of the present disclosure provide a method of performing continuous backup of a data file on a computing device, the method comprising:
  transmitting, to the backup server, a first network backup version of the data file, the backup server being constantly available to the computing device through an uninterrupted network connection between the computing device and the backup server;
  monitoring the data file to detect when a modification has been made to the data file;
  when a modification to the data file has been detected, refraining from transmitting backup data associated with the modification until a network time interval expires;
  storing, locally on the computing device, a delta file corresponding to the modification made to the data file; and
  upon expiry of the network time interval, transmitting a second network backup version of the data file to the backup server, the second network backup version comprising the backup data associated with the modification to the data file.

In various embodiments, a plurality of modifications are detected as being made to the data file, each at a different time before the expiry of the network time interval, and wherein the method further comprises repeating the refraining and the storing for each of the plurality of detected modifications.

In various embodiments, the delta file tracks differences between the modified data file and the first network backup version of the data file.

In various embodiments, the delta file comprises:
  a file indicator identifying the data file that the delta file relates to, and
  a parent network version indicator identifying the first network backup version of the data file transmitted to the backup server.

In various embodiments, one or more of the file indicator or the parent network version indicator is provided in a file name of the delta file.

In various embodiments, the method may comprise:
  for at least one of the plurality of modifications made to the data file, storing a control file locally on the computing device, wherein the control file includes:
    a first timestamp indicating when the modification was made to the data file, and
    a second timestamp indicating when the first network backup version of the data file was transmitted to the backup server.

In various embodiments, the control file comprises a file name containing the first timestamp, and the control file comprises a file date that is set to the second timestamp.

In various embodiments, the control file comprises:
  a file indicator identifying the data file that the control file relates to, and
  a parent network version indicator identifying the first network backup version of the data file transmitted to the backup server.

In various embodiments, one or more of the file indicator or the parent network version indicator is provided in a file name of the control file.

In various embodiments, prior to transmitting the second network backup version to the backup server, the method further comprises:
  determining if there is a previously-stored control file that has a second timestamp indicating when the first network backup version of the data file was transmitted to the backup server; and
  identifying the control file stored locally on the computing device as the previously-stored control file.

In various embodiments, a current version of the data file, that is present on the computing device at the expiry of the network time interval, is transmitted as the second network backup version to the backup server.

In various embodiments, a plurality of modifications are detected as being made to the data file, each at a different time before the expiry of the network time interval, and wherein the method further comprises:
  repeating the refraining and the storing for each of the plurality of detected modifications,
  wherein, the second network backup version includes the last delta file stored closest in time to the expiry of the network time interval.

In various embodiments, the delta file is deleted after a cleanup time interval, and wherein the cleanup time interval indicates the duration of time that the delta file should remain stored on the computing device prior to being deleted.

In various embodiments, the cleanup time interval is equal to the network time interval.

In various embodiments, the data file comprises an archive indicator that indicates when the data file has been modified, and wherein the monitoring the data file comprises reading the archive indicator.

In various embodiments, the method further comprises:
receiving input indicating that a version of the data file corresponding to the detected modification is to be restored;
retrieving the first network backup version from the backup server; reading the delta file; and
merging the retrieved first network backup version with the read delta file to restore the version of the data file.

In another aspect, some embodiments of the present disclosure provide a computing device for performing continuous backup of a data file, the computing device comprising a processor and a memory storing instructions which, when executed by the processor, cause the processor to:
transmit, to the backup server, a first network backup version of the data file, the backup server being constantly available to the computing device through an uninterrupted network connection between the computing device and the backup server;
monitor the data file to detect when a modification has been made to the data file;
when a modification to the data file has been detected, refrain from transmitting backup data associated with the modification until a network time interval expires;
store, locally on the computing device, a delta file corresponding to the modification made to the data file; and
upon expiry of the network time interval, transmit a second network backup version of the data file to the backup server, the second network backup version comprising the backup data associated with the modification to the data file.

In a further aspect, some embodiments of the present disclosure provide a computer readable medium storing instructions for performing continuous backup of a data file on a computing device, wherein the instructions, when executed by a processor of the computing device, cause the processor to:
transmit, to the backup server, a first network backup version of the data file, the backup server being constantly available to the computing device through an uninterrupted network connection between the computing device and the backup server;
monitor the data file to detect when a modification has been made to the data file;
when a modification to the data file has been detected, refrain from transmitting backup data associated with the modification until a network time interval expires;
store, locally on the computing device, a delta file corresponding to the modification made to the data file; and
upon expiry of the network time interval, transmit a second network backup version of the data file to the backup server, the second network backup version comprising the backup data associated with the modification to the data file.

DRAWINGS

Figure 2:
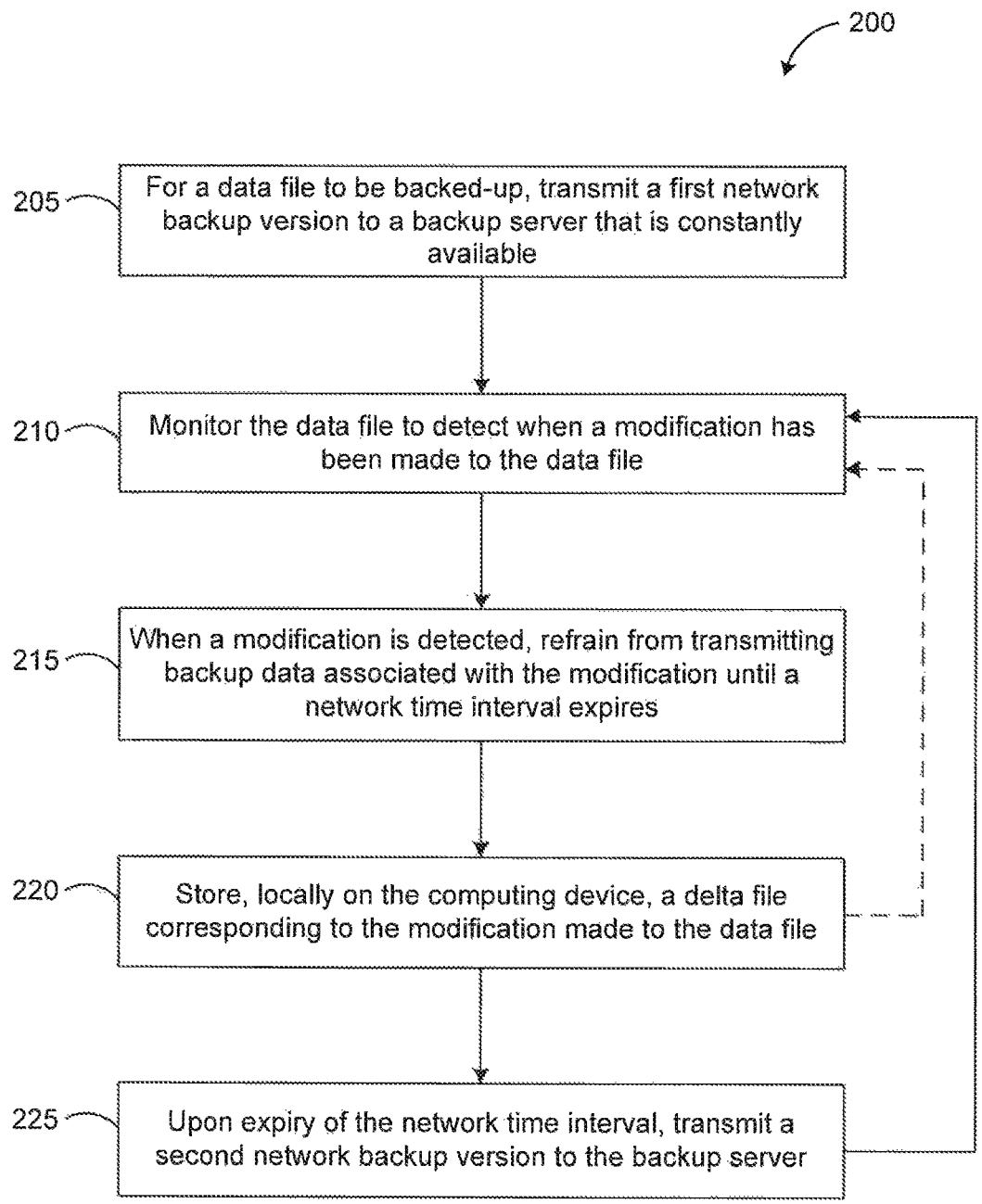
Figure 3:
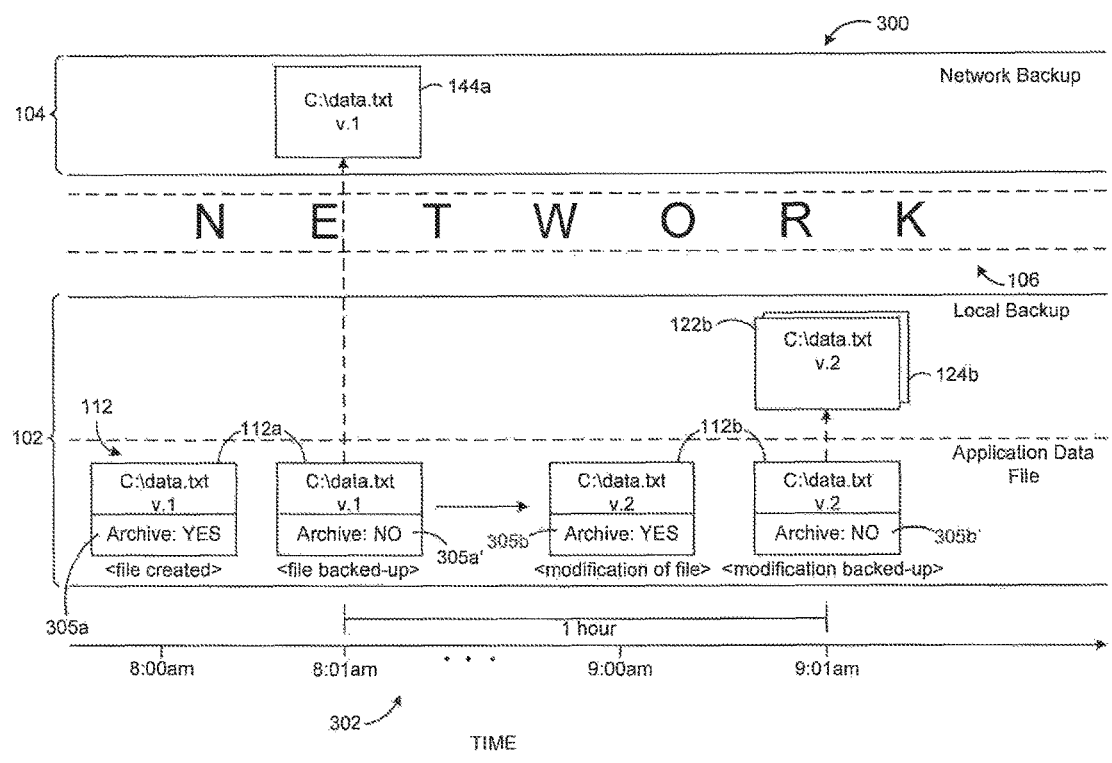
Figure 5:
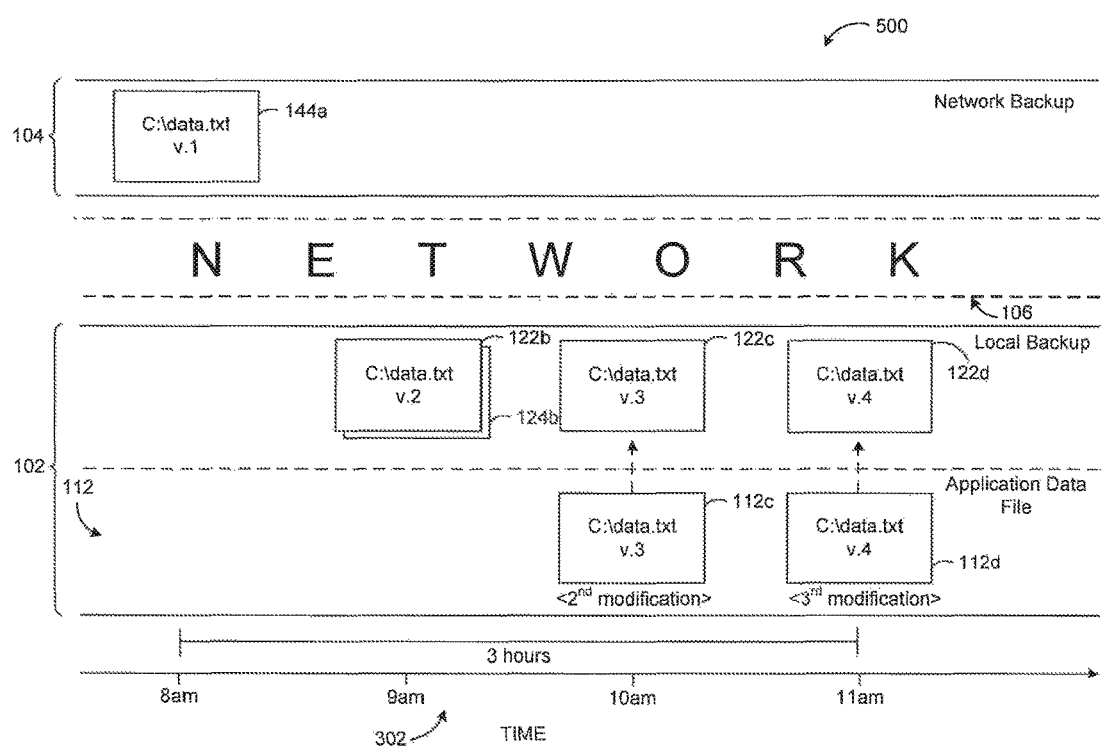
Figure 7:
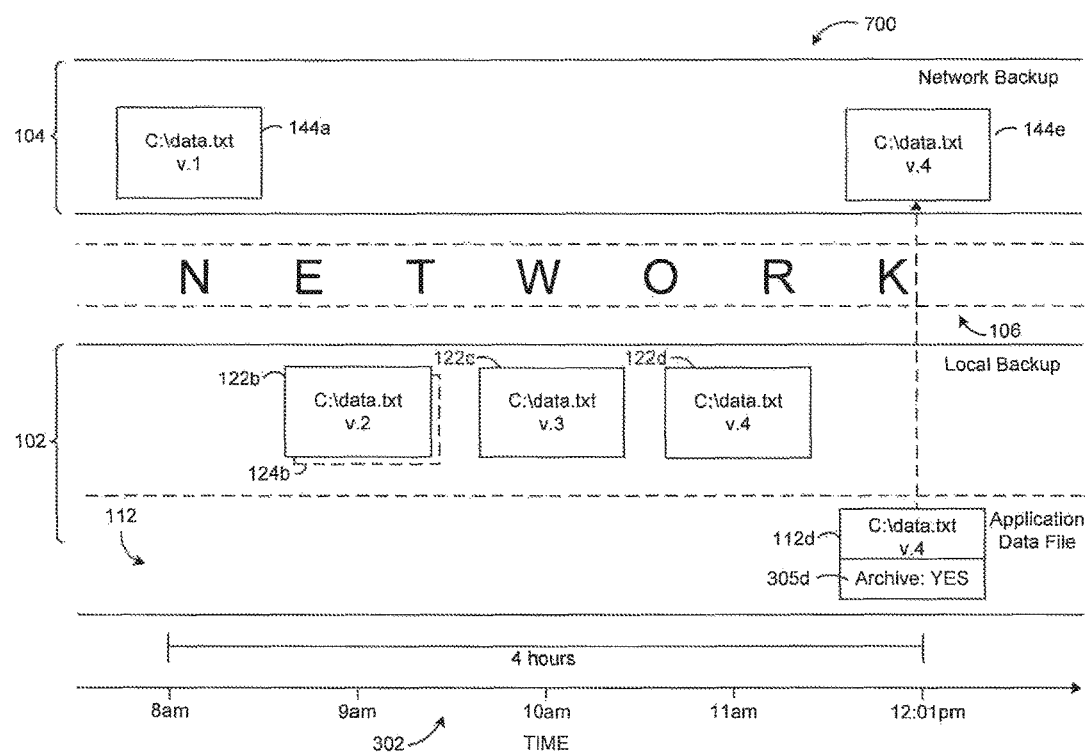
Figure 8:
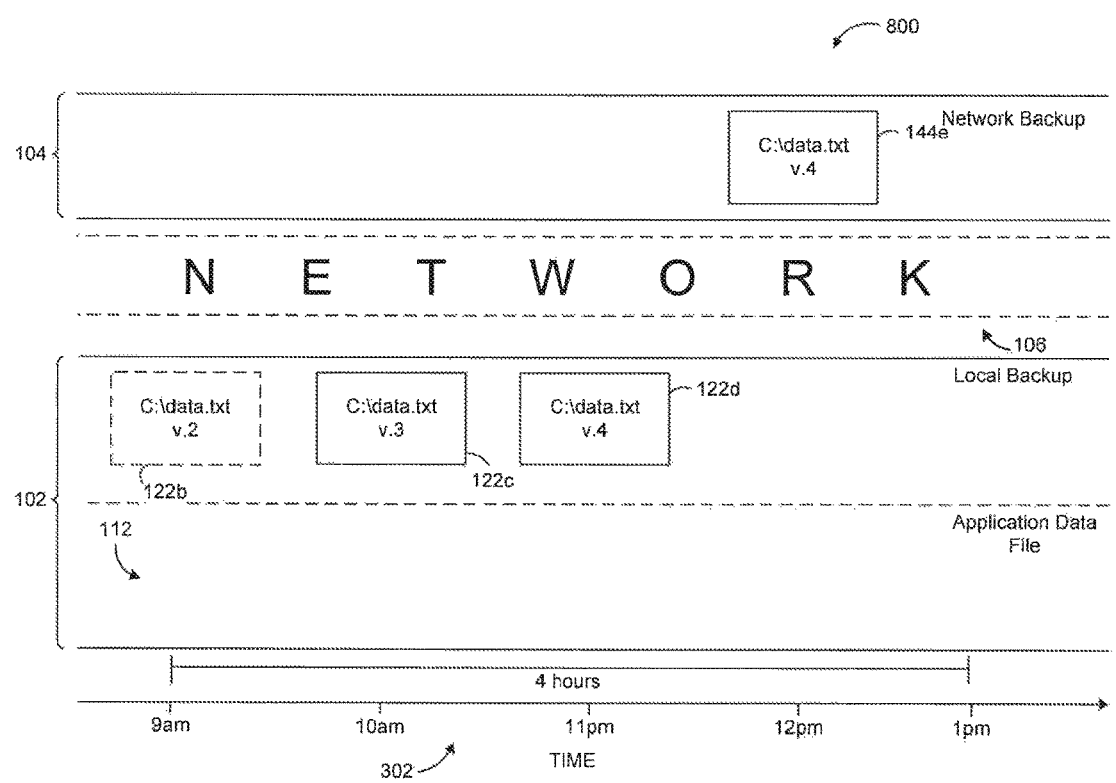
Figure 9:
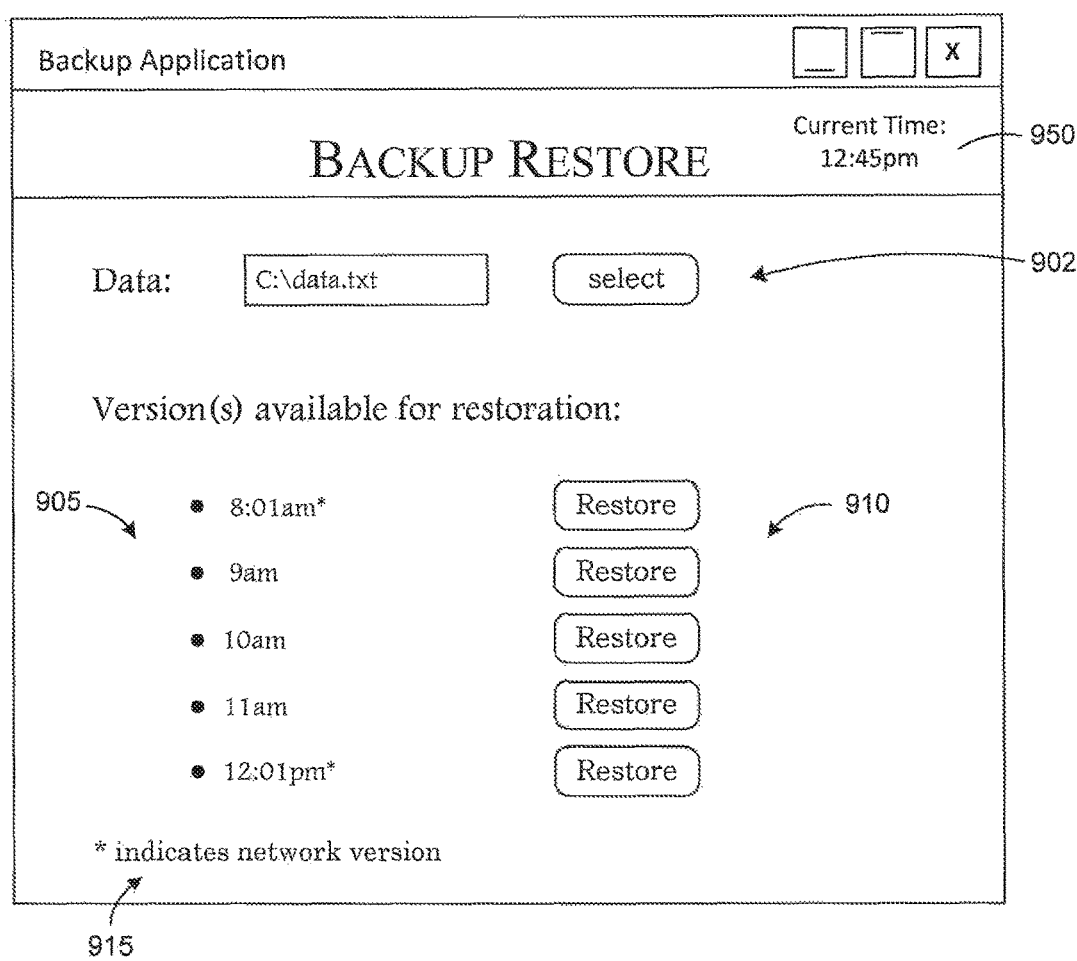
Figure 10:
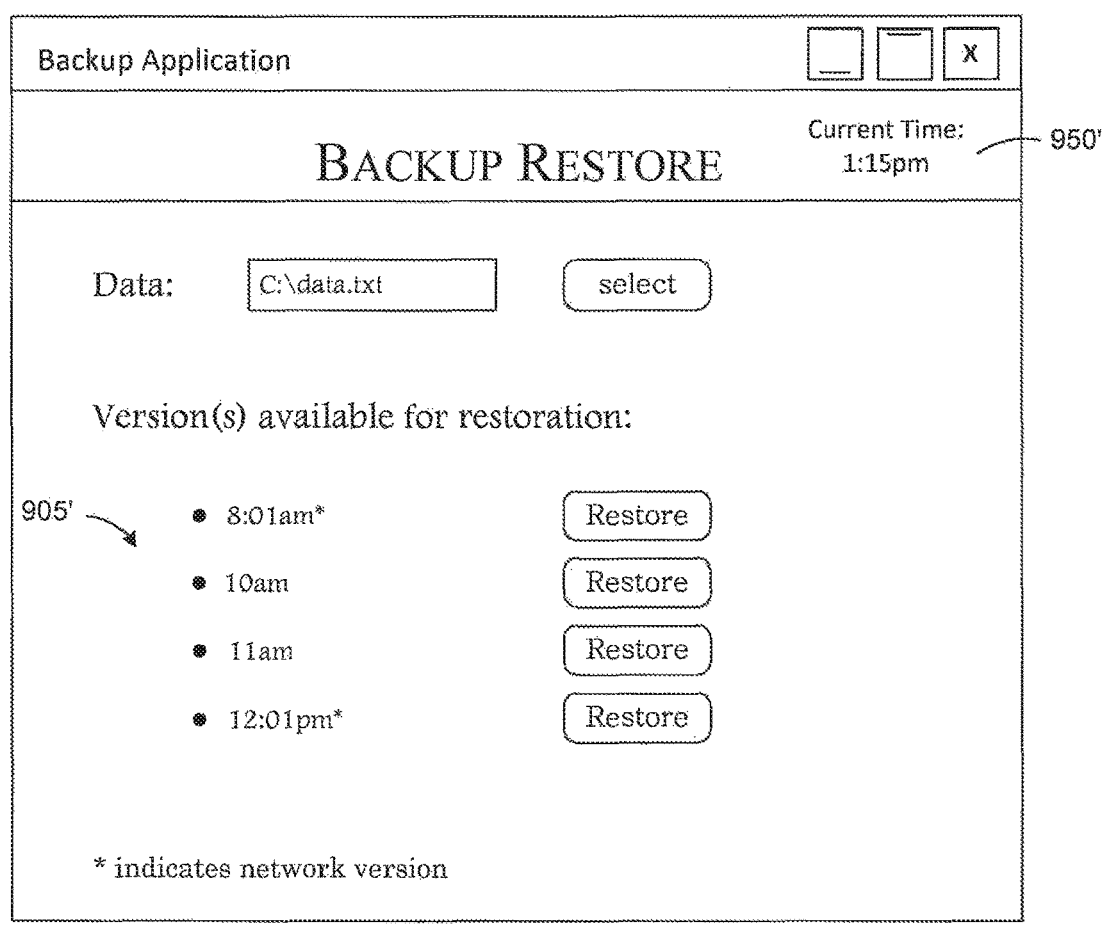

Embodiments of the present invention will now be described in detail with reference to the drawings, in which:
FIG. 1 is a block diagram of a system for performing continuous backup of data on a computing device, in accordance with at least one example embodiment;
FIG. 2 is a flowchart diagram showing the steps of a method for performing continuous backup of data on a computing device, in accordance with at least one example embodiment;
FIG. 3 is a timeline diagram showing a backup of an application data file when the application data file is first created and after a first modification is made to the application data file, in accordance with at least one example embodiment;
FIG. 4 is an illustration of certain properties of a delta file and a control file that are associated with the local backup of the application data file shown in FIG. 3, in accordance with at least one example embodiment;
FIG. 5 is a timeline diagram showing additional modifications made to the application data file shown in FIG. 3, and corresponding additional local backups, in accordance with at least one example embodiment;
FIG. 6 is an illustration of certain properties of the delta files associated with the local backups shown in FIG. 5;
FIG. 7 is a timeline diagram showing transmission of a network backup version of the application data file of FIGS. 3 and 5, upon the expiry of a network time interval, in accordance with at least one example embodiment;
FIG. 8 is a timeline diagram showing deletion of a delta file for a local backup of the application data file of FIGS. 3, 5, and 7, in accordance with at least one example embodiment; and
FIGS. 9 and 10 are example screenshots of a user interface for a backup application when restoring available backups, at different points in time before and after deletion of a local backup.

DETAILED DESCRIPTION

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor (e.g., a microprocessor), a data storage system (including volatile and non-volatile memory and/or storage elements), at least one input device, and at least one output device. For example and without limitation, the programmable computers may be a personal computer, laptop, personal data assistant, cellular telephone, smartphone device, tablet computer, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internal transmission or downloadings, magnetic and electronic storage media, digital and analog signals, and the like. The computer useable instructions may also be in various forms, including compiled and non-compiled code.

Referring to FIG. 1, shown there generally as 100 is a block diagram of a system for performing continuous backup of data on a computing device, in accordance with at least one example embodiment. The system may include a computing device 102 that is able to communicate with a backup server 104 via network 106. The computing device may be configured to execute program code that provides an application 110 and a backup module 120, each of which may be able to read and write data to the file system 130.

The described embodiments relate to the backup of data that may be stored on the file system 130. To illustrate the high-level operation of the system of the present disclosure, the block diagram of FIG. 1 is annotated with numbers in circles that show the sequence of interactions amongst the various components in an example embodiment.

Generally, an application 110 may create or modify an application data file 112 that is associated with the application 110 (circle 1). The backup module 120 may then monitor the application data file 112 to determine if a modification has been made to the application data file 112 (circle 2). If a modification is detected, a local backup can be created. The local backup may be made up of a delta file 122 indicating a difference between the modified version and the last version of the application data file 112 that was transmitted to the backup server 104, as well as a control file 124 that stores information about the local backup (circle 3). As additional modifications are made to the application data file 112, additional local backups may be created, which may result in the creation of further delta files 122. While modifications to the application data file 112 are continuously being backed up to the local file system 130, the backup module 120 may be counting down a network time interval that expires when the next network backup version is to be transmitted (e.g., the network time interval may be a predetermined period of time that the backup module 120 waits before sending successive network backups).

Upon the expiry of the network time interval, the backup module 120 may scan the file system 130 for the presence of a control file 124 that indicates that a local backup has occurred since the most-recent network backup to the backup server 104. If there has been such a local backup (as indicated by the presence of such a control file 124), then the backup module 120 may read the latest version of the application data file 112 (circle 4) and transmitting it as a network backup to the backup server 104 (circle 5). The network backup may be received at the backup server 104 by the backup application 140, which may then store the network backup as a network backup version 144 in a backup database 142 (circle 6).

If the computing device 102 subsequently receives input indicating that restoration of a network backup or a local backup is desired, the restore module 160 may then read the delta files 122 and/or retrieve a network backup version from the backup database 142 (circle 7).

In the present embodiments, instead of continually transmitting backup versions to the backup server 104, bandwidth may be saved by only periodically transmitting a network backup version 144 to the backup server 104 (e.g., sending network versions upon the expiry of the network time interval). In between the periodic network backups, modifications to the application data file 112 are stored locally on the file system 130 (e.g., as local backups that each have a delta file that can be merged with a previously-transmitted network backup version during restoration). In this manner, the present embodiments may provide a continuous backup experience that backs up all modifications made to the application data file 112, while reducing the amount of bandwidth that a continuous backup system would otherwise consume.

Further, since the computing device 102 may have access to more local disk space on the file system 130 than remote disk space on the backup server 104 (e.g., because the amount of remote disk space allotted for a given computing device 102 may typically be limited), the present embodiments may allow for a greater number of backup versions to be stored when compared with systems that only store backups remotely on the backup server 104.

Further details regarding each of the illustrated components in FIG. 1 will now be discussed.

Computing device 102 may be any suitable computing device that is capable of executing applications 110 stored on a memory of the computing device 102. In some embodiments, the computing device 102 may be the programmable computers discussed above. In some embodiments, the computing device 102 may be a personal computer (e.g. a desktop computer or a laptop computer) that contains a hard disk storing operating system software and application 110 software. As will be understood, the computing device 102 may organize data stored on the hard disk in the form of a file system 130 that stores data as electronic files and folders. The computing device 102 may include a network interface that allows the computing device 102 to connect to network 106, so as to communicate with backup server 104.

Applications 110 may be any suitable executable code that can be executed on the computing device 102. As will be understood, in operation, the applications 110 may save one or more application data files 112 to the file system 130. The application data file 112 may include data that the application 110 stores on the hard disk. For example, such data may allow an application 110 to preserve consistent state across different invocations of the application 110 (e.g., a settings or configuration file). Additionally or alternatively, the application data file 112 may include data created by users when using an application 110.

For example, if an application 110 is the Microsoft™ Word™ word processing application, the application data file 112 may be a document created using the word processing application. As will be understood, such an application data file 112 may have the file extension ".doc". In another example, if the application 110 is a web browser application, the application data file 112 may store the "bookmarks" or "favorites" data that indicates frequently-visited websites for a user of the web browser application.

It will be understood that the examples of applications 110 and application data files 112 discussed herein are provided for illustration purposes only, and that any type of application 110 and/or application data file 112 may be used with the embodiments of present disclosure. Particularly, an application 110 may include any type of instructions that are executable on the computing device 102 that can store an application data file 112 on the file system 130. An application 110 need not be a third-party application, but may also include, for example, operating system applications, processes, services, and/or threads.

Backup module 120 may be a software module that is designed to monitor an application data file 112 stored on the file system 130 for backup purposes. As used herein, the term application data file 112 may include electronic files containing data, as well as containers for storing electronic files such as folders or archives. In operation, the backup module 120 may receive input indicating the application data file 112 that is to be monitored on the file system 130. For example, the backup module 120 may receive this input as a file path. Additionally or alternatively, the backup module 120 may also be configured to store and/or receive input that indicates the duration of the network time interval and/or the cleanup time interval (the operation of the cleanup time interval is discussed below). In various embodiments, the backup module 120 may execute as a background process or service.

In various embodiments, the application data filed 112 stored on the file system 130 may be provided with an archive indicator (also called an archive flag or archive bit) that allows the backup module 120 to determine whether a given application data file 112 has been modified since the last time it was backed up. The backup module 120 may read this archive indicator when monitoring the application data file 112 for modifications. If the application data file 112 has been modified since the last backup (or if the application data file 112 is newly created since the last backup), the operating system on the computing device 102 may set the archive indicator to 'YES' (e.g., set the archive flag to true, or set the archive bit to '1'), so as to indicate to the backup module 120 that the application data file 112 is to be backed up. The backup may then be either a network backup (e.g., resulting in the transmission of a backup version to the backup server 104) or a local backup (e.g., resulting in the local storage of a delta file 122 and, in some cases, a control file 124). After the backup module 120 performs backup of the given application data file 112, the backup module 120 may clear the archive indicator.

In the subject embodiments, the backup module 120 may create both local backups and remote backups of a given application data file 112. As will be understood, local backups may be stored locally on the local file system 130 (or some other local storage on the computing device 102, such as a different volume or hard disk), whereas network backups may be stored on a backup server 104.

When storing a local backup of an application data file 112, the backup module 120 may store a delta file 122 that tracks the difference between the version being backed up and the last network backup version transmitted to the backup server 104.

For the first local backup that is stored after a network backup has been performed, the delta file 122 for the local backup may be associated with a control file 124 that stores information associated with the local backup. As discussed in greater detail below, the control file 124 may be used by the backup module 120 to determine whether or not a subsequent network backup needs to be conducted upon the expiry of the network time interval.

Backup server 104 may include a backup application 140 that communicates with a backup database 142 to store network backup versions 144. The backup server 104 may be any suitable computing device that executes a backup application 140, and is provided with a network interface so as to allow it to communicate with the computing device 102. In various embodiments, the backup server 104 may be a programmable computer, as described above. For example, the backup server 104 may a dedicated server computer such as rack-mounted server computer.

The backup application 140 may be an application executing on the backup server 104 that is configured to communicate with the backup module 120 on the computing device 102. To facilitate communications, the backup application 140 may, for example, be configured to listen on predetermined ports that the backup module 120 is configured to use when transmitting backup data to the backup application 140.

In operation, the backup module 120 on the computing device 102 may transmit backup data to the backup application 140. The backup application 140 may then store the received backup data into backup database 142. The overall process may be called a network backup. For example, the backup database 142 may be any suitable database that allows the storage and retrieval of data. Example database applications include Oracle™, MySQL™, DB2™, and Microsoft SQL Server™. While the use of a database 142 is discussed herein, it will be understood that the network backup versions 144 may be stored in other ways at the backup server 104. For example, the backup server 104 may have its own file system (not shown), which may be able to store network backup versions 144.

Network backup versions 144 may include the backup data that was transmitted to the backup server 104 from the backup module 120. In various embodiments, these network backup versions 144 may include full versions of the application data file 112 that is to be backed up. Alternatively, the network backup versions 144 may store just the delta file 122 indicating the difference between a given network back version 144 and an original version of an application data file 112 that had been backed up when the application data file 112 was created.

The restore module 160 may be configured to perform restoration of backups of the application data file 112. For example, the restore module 160 may be configured to communicate with the backup application 140 to identify the network, backup versions 144 that are available to be selected for restoration on the computing device 102. The restore module 160 may also be configured to read the delta files 122 stored on the file system 130 when restoring local backups. Having identified the backups that are available for restoration, the restore module 160 may be configured to present a user interface that allows a user of the computing device 102 to select the backups to be restored. Examples of such user interfaces are shown in FIGS. 9 and 10, and will be discussed in greater detail below.

The network 106 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

It will be understood that although only one backup server computer 104 is shown, in various embodiments, there may be a cluster of physical computers that is configured to provide the functionality of the backup application 140. Similarly, although only one computing device 102 is illustrated, it will be understood that there may be multiple computing devices 102 that are configured to send network backups to the backup server 104.

Referring to FIG. 2, shown there generally as 200 is a flowchart diagram of the steps of a method for performing continuous backup of data on a computing device, in accordance with at least one example embodiment. In various embodiments, the method may be performed by the computing device 102 shown in FIG. 1. When discussing FIG. 2, reference will also be made to the various components in FIG. 1.

To illustrate the method of FIG. 2, reference will further be made to the various timeline diagrams of FIGS. 3, 5, 7 and 8, which show generally as 300, 500, 700 and 800 respectively, successive time periods during the backup of an example application data file 112 with the file path "c:\data.txt" stored on the file system 130 of the computing device 102. In the figures herein, a letter with a reference number (e.g., '112a') is used to indicate a specific instance of an application data file 112. For example, the reference numeral 112 is generally used to refer to an application data file 112, but 112a is used to refer to a first version of the application data file 112. Similarly, 112b is used to refer to a second version of the application data file 112.

In the example scenario of FIGS. 3, 5, 7 and 8, the network time interval that the backup module 120 awaits before sending successive network backup versions may be set to "4 hours". For example, in operation, a timer may be set to calculate the amount of time elapsed since the transmission of a first network backup version 144. Once the elapsed time is determined to be equal to the network time interval, the network time interval may be considered to have expired.

In various embodiments, the network time interval may be configurable via a setting that can be user selected or automatically set within the backup module 120. Modification of the length of the network time interval may be desirable to suit the working needs of a user of the computing device. For example, during daytime working hours, the length of the network time interval may be configured to be shorter so that a higher number of modifications to the application data file 112 are captured on the backup server 104. Also, modification of the length of the network time interval may also be desirable to suit the availability of bandwidth to the computing device 102. For example, if a large amount of bandwidth is available, then the network time interval may be configured to be shorter so that network backups are performed more frequently. Conversely, if a small amount of bandwidth is available, then the network time interval may be configured to be longer so that network backups are performed less frequently.

At step 205, for an application data file 112 to be backed-up, a computing device 102 may transmit a first network backup version of the data file to a backup server 104. This may happen, for example, when a new application file 112 is created.

Referring simultaneously to FIG. 3, shown there generally as 300 is a timeline diagram of a first network backup and a local backup of an example application data file 112, in accordance with at least one embodiment. As illustrated, the progression of time 302 is shown at the bottom of FIG. 3. As well, the state of the example application data file 112 at different times indicated on the timeline 302 are shown above the timeline 302 (e.g., in the "application data file" portion of FIG. 3). If a local backup of application data file 112 (e.g., in this case, made up of a delta file 122b and a control file 124b) is conducted at a particular time indicated on the timeline 302 (e.g. "9:01 am"), the delta file 122b and/or the control file 124b associated with the local backup is illustrated immediately above the corresponding version of the application data file 112b that is being backed up (e.g., these files are illustrated in the "local backup" portion of FIG. 3). Similarly, if a network backup version 144a is created at a particular time indicated on the timeline 302 (e.g., "8:01 am"), the network backup version 144a is illustrated above the corresponding application data file 112a that is being backed up (e.g., in the "network backup" portion of FIG. 3).

As discussed above, the application data file 112 and the local backup files (e.g., the delta files 122 and/or control files 124) may be stored on the file system 130 of the computing device 102, and the network backup versions 144 may be stored on the backup server 104. FIG. 3 also shows the network 106 to illustrate that a network back version 144 may be transmitted through the network 106 before being stored at the backup server 104.

As illustrated, an application data file 112 ("c:\data.txt") is created at "8:00 am", This version is indicated as "v.1" 112a. As discussed above, the application data file 112 may have an archive indicator that indicates to the backup module 120 that the application data file 112 is ready to be backed up. For example, after the creation of the application data file 112, the operating system on the computing device 102 may set the archive indicator 305a for the file to be "YES" to indicate to the backup module 120 that the newly-created file is ready to be backed-up.

The backup module 120 may then read the archive indicator 305a (e.g., at "8:01 am" or some other time subsequent to the creation of the file), and proceed to send a first network backup version 144a of "v.1" 112a to the backup server 104. As illustrated, this first network backup version 144a is stored on the network backup server 104.

After the first network backup version 144a has been transmitted to the network backup server 104, the archive indicator 305a' of "v1" 112a may be reset to "NO" to indicate that backup for the file has already been performed.

In the present embodiments, the backup server 104 may be constantly available to the computing device 102 through an uninterrupted network connection between the computing device and the backup server 104. For example, as discussed below, the constant network connection may allow the computing device 102 to retrieve a network backup version 144 from the backup server 104 for restoration at any time after the network backup version has been transmitted to the network backup server 104.

Referring back to FIG. 2, at step 210, the application data file 112 may be monitored to detect when a modification has been made to application data file 112. The monitoring may be performed by the backup module 120 of the computing device 102. For example, the backup module 120 may read the archive indicator of an existing application data file 112 to determine if the archive indicator has been reset to "YES". This may happen, for example, if the application 110 has saved a new version of the application data file 112 to the file system 130 of the computing device 102.

At step 215, when a modification has been detected, the backup module 120 may refrain from transmitting backup data associated with the modification until a network time interval expires. As noted, the computing device 102 may have a constant and uninterrupted network connection with the backup server 104. However, despite the availability of this connection, the computing device 102 may be configured to refrain from sending a network backup version 144 of the newly-saved version of the application data file 112 to the backup server 104.

Instead, at step 220, the computing device 102 may be configured to store, locally on the file system 130 of the computing device 102, a delta file corresponding to the modification made to the application data file 112.

To illustrate steps 210 to 220, reference is again made to FIG. 3. Continuing on with the example of monitoring the "c:\data.txt" application data file 112 for continuous backup, at "9:00 am", the application 110 may save a new version of the file to create a second version (e.g., "v.2" 112b of the application data file 112). The modification of the application data file 112 may trigger the operating system on the computing device 102 to reset the archive indicator 305b to "YES", so that "v2" 112b of the file would be flagged for backup.

At some time subsequent to the saving of "v.2" 112b of the file (e.g., at "9:01 am"), the backup module 120 may detect that a modification has been made to the "c:\data.txt" application data file 112. For example, the backup module 120 may determine that the archive indicator 305b for the "c:\data.txt" application data file 112 has been reset to "YES".

While traditional continuous backup systems may typically perform a network backup of "v.2" 112b at this point in time, the present embodiments may instead refrain from transmitting a backup data until the network time interval has expired. As noted, in the example scenario of FIG. 3, the network time interval is set to "4 hours". Since only 1 hour has elapsed after the transmission of the network backup version 144a, a subsequent network backup version 144 should not be transmitted yet.

Instead, during this interim period, newly-saved versions of the application data file 112b may be backed up locally. As illustrated, "v.2" 112b is backed up on the local backup area of the file system 130 on the computing device 102.

As was the case with the transmission of the network backup version 144a at "8:01 am", once a backup has been performed of the application data file 112, the archive indicator 305b' can be reset to "NO" to indicate that backup has already been performed.

When storing local backup on the file system 130 of the computing device 102, the backup module 120 may generate a delta file 122b. As noted above, a delta file 122 may generally track differences between the modified application data file 112 and the first network backup version of the application data file 112. For the example shown in FIG. 3, the delta file 122b may store the difference between "v.2" 112b and "v.1" 112a of the application data file 112. In various embodiments, to determine a difference between the two versions of the file, the backup module 120 may perform a hash (e.g., a checksum or a Cyclic Redundancy Check (CRC)) of each of the blocks that make up the application data file 112 (e.g., a given file may be divided up into blocks of 64 kilobytes each). The backup module 120 may then compare each of these hashes to hashes of the corresponding blocks in the last network version 144a transmitted to the backup server 104 to identify only the blocks of the application file 112 that have been modified. The delta file 122b may then only contain data that has been modified for these blocks. Storing a delta file 122b in this manner may reduce the file size of the local backup that might otherwise be stored.

Since delta files 122 may only contain data that tracks the difference between a given local backup and the last network backup version 144, the delta file 122 may include a parent network version indicator that identifies the network backup version 144 that the delta file is related to.

Referring to FIG. 4, shown there generally as 122b is an illustration of certain properties of a delta file associated with the local backup shown in FIG. 3, in accordance with at least one example embodiment. As shown, the file name 450 of the delta file 122b may contain a file indicator 460b that identifies the data file that the delta 122b relates to. For example, as illustrated, the file indicator 460b indicates the file path of the application data file 112 that the delta file 122b (e.g., "c_data.txt"). It will be understood that the format of the file indicator 460b is shown for illustrative purposes only, and that other ways of providing a file indicator 460b may be possible. For example, in various embodiments, a file code that represents the file path may be used as the file indicator 460b. Additionally or alternatively, the file indicator 460b may include a separate folder code that indicates the folder that a given application data file 112 is stored in on the file system 130, and a separate file code that indicates the file name of the application data file 112 itself. Such codes may be alphanumeric strings that are used internally by the backup module 120 and/or the restore module 160 to identify a given folder, file, and/or file path.

Additionally, the file name 450 may contain a parent network version indicator 470b that indicates the parent network version of the application data file 112 that was most recently sent to the backup server 104. For example, FIG. 4 shows "1" for the parent network version indicator 470b to show that the most recent network version transmitted for the application data file 112 is "v.1" 144a shown in FIG. 3.

As well, the date property 480b of the delta file 122b may be set to the timestamp of when the local backup for the delta file 122b was created. For example, as illustrated, since "v.2" 112b of the application data file 112 was created at "9:01" am (and presuming the calendar date on which the example scenario of FIG. 3 is taking place is on "13 Mar. 2013"), the date property of the delta file 122b may be set to "090113Mar2013" (which may be interpreted as "0901 on 13 Mar. 2013"). In various embodiments, the file name 450 may also a timestamp 475b for when the local backup for the delta file 122b was created.

Additionally or alternatively, the file name may further store a local version indicator (not shown). For example, in such embodiments, the number "2" may appear in the file name of the delta file 122b to indicate that the delta file 122b corresponds to "v.2" of the application data file 112b.

Further, in various embodiments, the delta file 122 may also contain (either in its file name 450 or in the header information for the delta file 122) a file size of the application data file 112 when the delta file 122 was created and/or a CRC of the application data file 112 when the delta file 122 was created. These items may be usable by the restore module 160 during the restoration of a given local version associated with the delta file 122 to check that generated restored version is correct.

As will be discussed in greater detail below, upon the expiry of the network time interval, the backup module 120 may be configured to send a subsequent network backup to the backup server 104. However, since the archive indicator 305b' for the application data file 112 (as shown in FIG. 3)

has been reset to "NO", the backup module 120 may need another mechanism to determine whether there has been any modification to the application data file 112 after the transmission of the previous network backup version 144*a*.

To determine whether there has been any such modifications, the backup module 120 may scan a predetermined location on the file system 130 for files related to local backups that may have been created since the transmission of the first network backup version 144*a* (e.g., the local backup of "v2" 112*b* of the application data file 112). If data corresponding to local backups are located, the backup module 120 may then infer that modifications have been made to the application data file 112.

Still referring simultaneously to FIG. 4, shown there generally as 124*b* is an illustration of certain properties of a control file associated with the local backup shown in FIG. 3, in accordance with at least one example embodiment. In some embodiments, control files 124 may be generated for the purpose of allowing the backup module 120 to determine whether local backups have been created since the transmission of the most-recent network backup version 144. A control file 124 may store information relating to two timestamps: a first timestamp that indicates when the modification was made to the application data file 112 (e.g. in FIG. 3, when "v2" 112*b* was created), and a second timestamp that indicates when the most recent network backup version 144 of the application data file 112 was transmitted to the backup server 104 (e.g., in FIG. 3, when network backup version 144*a* was transmitted to the backup server 104).

The presence of the second timestamp on the control files 124 may assist the backup module 120 in quickly locating control files 124 that are relevant to determining whether a local backup has been created for a given application data file 112. For example, when scanning for control files 124 that correspond to local backups, the backup module 120 may be able to simply identify all the control files for a given application data file 112 with a second timestamp that is substantially equal to when the network time interval started (e.g., equal to when the most recent network backup version 144 was transmitted). Any such identified control files would then correspond to a local backup of the application data file 112 during the network time interval, so as to indicate to the backup module 120 that a subsequent network backup version 144 is needed. As discussed below, this type of scanning will not locate any control files 124 that are older than the start of the network time interval because once a subsequent network backup version 144 is transmitted, all the control files 124 for a given application data file 112 are deleted.

FIG. 4 shows an example implementation of how these timestamps may be incorporated into properties of a control file 124, for the local backup shown in the example scenario of FIG. 3. As illustrated, the file date property 440*b* of the control file 124*b* is set to the second timestamp of when the most recent network backup version 144*a* was transmitted. Since the most recent network backup version 144*a* in FIG. 3 was transmitted at "8:01 am", and presuming the calendar date on which the scenario of FIG. 3 is taking place is on "13 Mar. 2013", the second timestamp may then be set to "080113Mar2013" (which may be interpreted as "0801 on 13 Mar. 2013"). It will be understood that the format of the timestamp shown herein is for illustrative purposes only, and that computing devices 102 may record timestamps in a variety of formats depending on the nature of the operating system and/or the computing device 102.

In FIG. 4, the first timestamp 430*b* indicating when the local backup corresponding to the control file 124 was created may be incorporated into the file name 405 of the control file 124. Since the local backup in FIG. 3 was created a "9:01 am", the first timestamp may therefore indicate that the local backup to which the control file 124*b* corresponds was created on "0901131Mar2013" (which may be interpreted as "0901 on 13 Mar. 2013").

Similar to the naming convention of the delta file 122*b*, the file name 405 for the control file 124*b* may also contain a file indicator 410*b* that identifies the application data file 112 that the control file 124*b* is related to, as well as a parent network version indicator 420*b* to indicate the network backup version of the application data file 112 that was most recently transmitted prior to the creation of the control file 124*b*. As illustrated, a representation of the file path is the file indicator 410*b*. However, as discussed above with respect to the file indicator 460*b* for the delta file 122*b*, different formats for providing the file indicator 410*b* may be possible. FIG. 4 also shows "1" for the parent network version indicator 420*b* to show that "v.1" 144*a* is the most recent network backup version sent to the backup server 104 prior to the creation of the control file 124*b*.

Referring again to FIG. 2, after storing a local backup at step 220, the method may loop back to step 210 (as shown by the dotted arrow) to continue monitoring the application data file 112 to determine if additional modifications have been made. If additional modifications are detected, each at a different time before the expiry of the predetermined time interval, the backup module 120 may repeat steps 215 and 220 for each of the additional modifications that are detected. Specifically, for each additional detected modification, the backup module may repeat refraining from transmitting another network backup version, and instead storing a local backup.

Referring to FIG. 5, shown there generally as 500, is a timeline diagram showing additional modifications made to the application data file 112 shown in FIG. 3, and corresponding additional local backups, in accordance with at least one example embodiment. FIG. 5 shows a timeline diagram similar to that of FIG. 3, except that various details about the creation of a backup have been omitted for clarity of illustration. Particularly, in FIG. 5, modifications of the archive indicator of the application data file 112 are not shown. As well, the backup module 120 is illustrated as backing up a modified version of the application data file 112 at the time of modification, even though there may be a gap in time between the modification of the file and the creation of the actual backup version.

As illustrated, FIG. 5 shows the first network version 144*a* stored on backup server 104, as well as the local backup of "v.2" 112*b* (with delta file 122*b* and control file 124*b*) from FIG. 3. In FIG. 5, however, timeline 302 has been extended to show additional modifications made to the application data file 112 at "10 am" and "11 am".

At "10 am", a second modification may be made to the "c:\data.txt" application data file 112 to create version "v.3" 112*c*. Since at "10 am", the network time interval of "4 hours" has still not expired (i.e., only 2 hours has elapsed since the network backup version 144*a* was transmitted), a second local backup of version "v.3" 112*c* may be created. This local backup may include the delta file 122*c*. When storing the local backup for "v.3" 112*c*, the backup module 120 may scan the file system 130 to determine if there has already been a control file 124 created since the most recent network backup version 144 for the application data file 112 was transmitted to the backup server 104. In the example scenario shown in FIG. 5, the backup module 120 may determine that the control file 124*b* for "v.2" of the application data file 112 has already been created. As a result, the backup module 120 may not create another control file 124 because, as discussed below, only one control file 124 is needed after a given network backup to indicate that a subsequent network backup should be performed.

Similarly, at "11 am", a third modification may be made to the "c:\data.txt" application data file 112 to create version "v.4" 112*d*. Since at "11 am", the network time interval of "4 hours" has still not yet expired (i.e., only 3 hours has elapsed), a third local backup of version "v.4" 112*d* of the application data file 112 may be created. This local backup may include the delta file 122*d* (but no additional control file 124).

Viewed another way, since each of versions "v.3" 112*c* and "v.4" 112*d* of the application data file 112 were created before the expiry of the network time interval of "4 hours", the refraining and storing steps of 215 and 220 can be considered to be repeated to generate local backups for each version respectively.

Referring to FIG. 6, shown there generally as 600 is an illustration of certain properties of the delta files 122 associated with the local backups shown in FIG. 5. As illustrated, FIG. 6 shows all the delta files 122 that may be stored for the local backups that may have been created since the most-recent network backup version 144*a*. In particular, FIG. 6 shows the details of the delta file 122*b* already discussed above with respect to FIG. 4. Additionally, FIG. 6 shows properties of the additional delta files 122*c*, 122*d* that were created for the local backups of version "v.3" 112*c* and version "v.4" 112*d* respectively.

The delta files 122*c*, 122*d* may be named in a manner that is similar to the naming of the delta file 122*b*. For example, the file names 450 for each delta file 122 may contain a file indicator 460*c*, 460*d*, a parent network version indicator 470*c*, 470*d*, and a timestamp 475*c*, 475*d* that indicates when the delta files 122*c*, 122*d* were created. The file dates 480*c*, 480*d* may also indicate when the delta files 122*c*, 122*d* were created. As illustrated, for the delta file 122*c*, the parent network version indicator 420*c* is set to "1" (to indicate that its related network backup version is "v.1" 144*a* shown in FIG. 5) and the timestamp 475*c* is set to "100013Mar2013" to indicate when version "v.3" 112*c* was created. The file date 480*c* is also set to "100013Mar2013". Similarly, for the delta file 122*d*, the parent network version indicator 470*d* is also set to "1" (to indicate that its related network backup version is also "v.1" 144*a* shown in FIG. 5) and the timestamp is set to "110013Mar2013" to indicate when version "v.4" 112*d* was created. The file date 480*d* is also set to "110013Mar2013".

For clarity of explanation, FIG. 6 does not illustrate the file properties of the control file 124*b* shown in FIG. 5 as such file properties were shown in FIG. 4.

Referring again to FIG. 2, at step 225, upon expiry of the network time interval, the method may proceed to transmit a second network backup version to the backup server 104. As indicated above, the backup module 120 may not be able to determine whether a second network backup is required based on reading the archive indicator on the application data file 112 alone. This is because the archive indicator 305 on a given application data file 112 may have been reset to "NO" after a local backup was performed. The archive indicator 305 being set to "NO" would typically indicate to the backup module 120 that no backup activity is necessary.

However, since the presence of a local backup effectively indicates that there has been modification of an application data file 112 after the transmission of the earlier network backup version 144 (and that a second network backup version needs to be transmitted to the backup server 104), the backup module 120 may be configured to scan for the presence of a control file 124 corresponding to a local backup for the application data file 112. As noted above, to facilitate this scanning, the second timestamp of the control file 124 may be set to the time when the earlier network version 144 was transmitted. This may make it easier for the backup module 120 to determine if there is a relevant control file by simply determining whether there are any control files with a second timestamp that is substantially equal to the start of the network time interval (e.g., by finding all control files that has a second timestamp matching the time that the earlier network version 144 was transmitted).

Once it is determined that there is at least one such control file, the backup module 120 may infer that a modification has been made to the application data file 112. The backup module 120 may then cause a current version of the data (e.g., the version of application data file 112 that is actually stored on the file system 130) to be sent to the backup server 104. The backup module 120 may do this by, for example, resetting the archive indicator of the application data file to "YES", so that the backup module 120 may notice the archive indicator and send a copy of the application data file 112 to the backup server 104.

Referring to FIG. 7, shown there generally as 700 is a timeline diagram showing transmission of a network backup version of the application data file 112 shown in FIGS. 3 and 5, in accordance with at least one example embodiment. FIG. 7 shows a timeline diagram similar to that of FIG. 5, but with the timeline 302 being extended further to show time "12:01 pm" when the network time interval of "4 hours" has expired. At this time, the backup module 120 may scan for a previously-stored control file 124 having a second timestamp that is substantially equal to the start of the network time interval that has just elapsed (e.g., determine if there is a previously-stored control file that has a second timestamp indicating when the earlier network backup version 144*a* was transmitted to the backup server 104).

As illustrated in FIG. 7, the delta files 122*b*, 122*c*, and 122*d* for the local backups of versions "v.2", "v.3", and "v.4" are shown. When performing the scan for a control file 124, the backup module 120 may identify control file 124*b*, that may be present on the file system 130 of the computing device 102 as a result of the local backup of version "v.2" of the "c:\data.txt" application data file 112. The backup module 120 may be able to locate this control file 124*b* because the start of the network time interval would have been at "8:01 am", and, as discussed above, the second timestamp for the control file 124*b* would be set to "8:01 am" (the time of the previous network backup version 144*a*)—a time that is substantially equal to the start of the network time interval. While the second timestamp and the start of the network time interval are illustrated as both having the exact same time (e.g., "8:01 am"), it will be understood that the backup module 120 may be configured to interpret the start of the network time interval and the second timestamp to be substantially equal even if they are not exactly the same (e.g., if they are within a predetermined number of minutes of each other).

Once a control file 124*b* has been identified, the backup module 120 may proceed to transmit a current version of the application data file 112 to the backup server 104. As discussed, this may be accomplished by the backup module 120 resetting the archive indicator 305*d* to "YES", so that the backup module 120 may subsequently read this indicator and determine that the current version of the application data file 112 needs to be backed up. The backup module 120 may then proceed to perform a network backup of the application data file 112. As illustrated, version "v.4" 112d of the application as filed is then backed up to the backup server 104, and stored as a network backup version 144e.

In an alternate embodiment, instead of transmitting a current version of the application data file 112 to the backup server 104 as the second network backup version 144e, data from the last local backup (e.g., the information stored locally on the computing device 102 corresponding to the modification made to the data) may be transmitted as the second network backup version 144e. If there have been multiple modifications to the monitored data during the network time interval, the second network backup version 144e may include the information corresponding to the last modification made closest in time to the expiry of the network time interval. As each of the delta files 122 track differences between the local backup and the last network backup version 144, transmitting data solely for the delta file 122 created closest in time to the expiry of the network time interval would capture a version of the application data file 112 that closely reflects the actual application data file 112 stored on the file system 130 at the time that the second network backup is transmitted.

For example, in the example scenario shown in FIG. 7, after identifying the control file 124b with a second timestamp set to when the first network backup version was transmitted to the backup server 104, the backup module 120 may be configured to select the delta file 122 with the latest creation timestamp (e.g., the delta file 122d having "11:01 am" creation file date property 480d shown in FIG. 6) for inclusion in a subsequent network backup. The backup module 120 may then include the data from the delta file 122d in the second network backup version 144e.

Referring yet again to FIG. 2, after the completion of the step 225, the process may loop back to step 210 (as shown with the arrow from step 225 to step 210), and the backup module 120 may begin to monitor the application data file 112 again for further modifications. As well, the timer for the network time interval may be reset. For example, in the example scenario of FIG. 7, any further modifications to the application data file 112 made after the transmission of the second network version 144e may be stored in local backup (e.g., steps 215 and 220 may be repeated) until the network time interval expires again at approximately "4:01 pm" (e.g., another four hours from the transmission of the second network backup version 144e at "12:01 pm"). In the interval between "12:01 pm" and "4:01 pm", the local version would then consider the second network backup version 144e (e.g., "v.4" of application data file 112d) as their parent network version. At "4:01 pm" a further network backup version 144 (not shown) may be transmitted to the backup server 104 if there were modifications made to the application data file 112 during the interval in between "12:01 pm" and "4:01 pm".

Referring back to FIG. 7, after transmitting a second network backup version 144e to the backup server 104, the backup module 120 may proceed to delete the control file 124b that was created prior to the expiry of the network time interval. As illustrated in FIG. 7, the control file 124b is shown with dotted outline to indicate that they have been deleted after the second network backup version 144e has been transmitted to the backup server 104. Since the purpose of the control file 124b was to provide a mechanism that allows the backup module 120 to determine whether a subsequent network backup version 144 needed to be transmitted, the control file 124b will no longer be referenced after the network backup version 144e was in fact transmitted. As such, the control file 124b created before the expiry of the network time interval expiring at "12:01 pm" can be safely deleted.

As well, the deletion of the control file 124b removes the presence of any control files 124 for the application data file 112 so that when further modifications are made to the application data file 112 (and an additional control file 124 is created), only that newly-created control file 124 will be present on the file system 130. This may facilitate the later scanning for the availability of control files 124 that may be performed to determine if there were any further modifications made to the application data file 112 since the transmission of the second network backup version 144e.

For example, upon the expiry of the next network time interval (e.g., at "4:01 pm"), the backup module 120 need only again determine whether there are any control files 124 stored on the file system 130 for this application data file 112 with a second timestamp substantially equal to the expired network time interval (e.g., with a second timestamp set to "12:01 pm" because control files created between "12:01 pm" and "4:01 pm" will have had their second timestamps set to the time of the most recent network version 144e, as discussed above). In performing this search, the backup module 120 would not erroneously locate the control file 124b for a local backup that was performed prior to the transmission of the most recent network backup version 144e, because that control file 124b would have been deleted.

Referring now to FIG. 8, shown there generally as 800 is a timeline diagram showing deletion of a local backup of the application data file of FIGS. 3, 5, and 7 in accordance with at least one example embodiment. FIG. 8 shows a timeline diagram similar to that of FIG. 7, but with the timeline 302 showing a further time "1 pm" after the transmission of the second network backup version 144e.

In various embodiments, the backup module 120 may be configured to track a "cleanup" time interval that indicates the duration of time that delta files 122 should remain on the file system 130 prior to being deleted. The ability to configure the cleanup time interval may reduce the amount of disk space required to operate the system of the present embodiments, by regularly deleting delta files 122 for local versions that may no longer be needed.

In the example scenario shown in FIG. 8, the cleanup time interval may be set to "4 hours". As shown in FIG. 8, the network backup version 144e sent at "12:01 pm" may be available for restoration. Similarly, the local delta files 122c and 122d for local backups taken at "10 am" and "11 am" may also be available for restoration. However, since at "1 pm", the cleanup interval has expired for the "9 am" local backup, the delta file 122b corresponding to that local backup may be deleted (as shown in dotted outline to indicate its deletion).

It will be understood that the steps performed upon the expiry of the cleanup time interval may generally be unrelated to the steps performed upon the expiry of the network time interval. For example, whereas the steps performed upon the expiry of the cleanup time interval relate to when delta files 122 are deleted from the "local backup" area of the file system 130 on the computing device 102, the steps performed upon the expiry of the network time interval relate to when a network backup of the application data file 112 is conducted (e.g., when a current version of the application data file 112 is transmitted to the backup server 104).

As noted above, however, in some embodiments, instead of transmitting a current version of the application data file 112 to the backup server 104 as the network backup version, data from a local backup (e.g., the delta file 122 stored locally on the computing device 102 corresponding to the modification made to the application data file 112) may be transmitted as the network backup version 144. In such case, the cleanup time interval may be configured to be greater than or equal to the length of the network time interval so as to ensure that any modifications made to the application data file 112 stored as local backups are not deleted before (and are available to be transmitted as a network backup version when) the network time interval expires.

As illustrated, the cleanup time interval and the network time interval is indicated as being both equal to "4 hours", The two time intervals being the same as each other may facilitate ease of configuration of the backup module 120 because a user may not need to provide inputs for each of the two time intervals individually. Rather, they may be able to input the same length of time for both the network time interval and the cleanup time interval, even though the network time interval and the cleanup time interval may serve different purposes.

In alternative embodiments, the two time intervals need not be the same length. For example, the backup module 120 may be configured to be longer than the network time interval so that at any given time, additional local backup versions prior to the most recent network backup version 144 can be retrieved and restored. In the example scenario discussed above, the cleanup time interval may, for example, be set to "8 hours" (e.g., twice the length of a "4 hour" network time interval).

In FIG. 8, no application data file 112 is shown. This may be because the application data file 112 has become corrupted and is no longer usable. The backup module 120 may thus be invoked to restore the backups of the "c:\data.txt" application data file 112.

Referring to FIG. 9, shown there generally as 900 is an example screenshot of a user interface for a backup application showing available versions of data to restore. The user interface may provide a control 902 that receives input regarding the data that is to be restored. Continuing on with the example scenario discussed in FIG. 8, the control 902 shows that the "c:\data.txt" application data file 112 is selected to be restored. The user interface may then also show the different versions 905 available for restoration. Beside each version, there may be user-selectable options 910 that, when selected, allow restoration of the indicated version.

As shown, the versions that are available for restoration may depend on the time when the restoration user interface 900 is shown. As shown in FIG. 9, an indication 950 of the current time is provided. At the current time of "12:45 pm", prior to the expiry of the cleanup time interval for the "9 am" local backup, it can be seen that backup versions for the "8:01 am" network backup, the "9 am" local backup, the "10 am" local backup, the "11 am" local backup, and the "12:01 pm" network backup are available for restoration.

As illustrated in the user interfaces of FIGS. 9 and 10, an asterisk is provided next to the network backup versions to indicate that those may not be deleted according to the cleanup time interval. It will be understood that visually distinguishing the network backup versions on the user interface may not be necessary, and that a simple listing that shows both network backup versions and local backup versions together without visual distinction may be possible.

Referring to FIG. 10, shown there generally as 900' is an example screenshot of a user interface for a backup application showing available versions of data to restore. The user interface of FIG. 10 is similar to that which is shown in FIG. 9, except that it is for a time that is subsequent to that which is shown in FIG. 9. As shown, the current time indicator 950' is "1:15 pm", which is after the expiry of the "4 hour" cleanup time interval for the "9 am" local backup. As such, the "9 am" delta file 122b would have been deleted (as discussed above with respect to FIG. 8), and the versions 905' available for restoration no longer list the "9 am" local backup as being available for restoration.

As noted, data stored for a local backup of a given version of data may only include the difference (as stored in the delta file 122) between the given version and a most recent network version 144. As such, when a local backup for a given version of the application data file 112 is selected to be restored (e.g., such selection input may be received by the computing device 102 via a user interface such as is shown in FIGS. 9 and/or 10), the backup module 120 may first retrieve the most recent network backup version 144 that was transmitted prior to the creation of the local backup. The backup module 120 may then read the delta file corresponding to the version of the application data file 112 that is desired to be restored, and merge the retrieved network backup version 144 with the data in the delta file 122 to restore the version of the application data file 112 that is desired. Referring back to FIG. 6, for example, the most recent network backup version 144 can be determined by reading the parent network version indicator 470 of a given delta file 122. The network backup version indicated can then be retrieved so that it can be merged with the data in the delta file 122 for the version of the application data file 112 that is desired to be restored.

Once the restored version has been generated, the correctness of the restored version can be checked by referring to the original file size of the application data file 112 and/or the CRC that is stored in the delta file 122 (which may be in the file name or the header information of the delta file 122, as discussed above).

In the present embodiments, each piece of data (e.g., each application data file 112) being monitored may be on its own schedule of network time intervals and/or cleanup time intervals. Unlike backup systems that backup all files/folders at a fixed scheduled time, the present embodiments may reduce the possibility of data loss by allowing each piece of data to be backed up according to its own schedule. For example, if the network time interval is "4 hours", every time an application data file 112 is created or backed up to the backup server 104, the network time interval is reset for that particular file. This may ensure that for every piece of data that is monitored, the network backup version will be no older than the network time interval. Data losses, if any, would be limited to versions that are created during the network time interval. The possibility of such losses, however, are even further minimized because the losses would only occur if the local backups are somehow prevented from being restored.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that acts and the order of the acts performed in the processing described herein may be altered, modified and/or augmented yet still achieve the desired outcome.

For example, the steps of a method in accordance with any of the embodiments described herein may be performed in any order, whether or not such steps are described in the claims, figures or otherwise in any sequential numbered or lettered manner. Also, in the various user interfaces illustrated in the figures, it will be understood that the illustrated user interface text and controls are provided as examples only and are not meant to be limiting. Other suitable user interface elements may be possible.

As used herein, the wording "and/or" is intended to represent an inclusive-or. That is "X and/or Y" is intended to mean X or Y or both. Moreover, "X, Y, and/or Z" is intended to mean X or Y or Z or any combination thereof.

The invention claimed is:

1. A method of performing continuous backup of a data file on a computing device, the method comprising:
   transmitting, to the backup server, a first network backup version of the data file, the backup server being constantly available to the computing device through an uninterrupted network connection between the computing device and the backup server;
   monitoring the data file to detect when a modification has been made to the data file;
   when a modification to the data file has been detected, refraining from transmitting backup data associated with the modification until a network time interval expires;
   storing, locally on the computing device, a delta file corresponding to the modification made to the data file; and
   upon expiry of the network time interval, transmitting a second network backup version of the data file to the backup server, the second network backup version comprising the backup data associated with the modification to the data file.

2. The method of claim 1, wherein a plurality of modifications are detected as being made to the data file, each at a different time before the expiry of the network time interval, and wherein the method further comprises repeating the refraining and the storing for each of the plurality of detected modifications.

3. The method of claim 1, wherein the delta file tracks differences between the modified data file and the first network backup version of the data file.

4. The method of claim 1, wherein the delta file comprises:
   a file indicator identifying the data file that the delta file relates to, and
   a parent network version indicator identifying the first network backup version of the data file transmitted to the backup server.

5. The method of claim 4, wherein one or more of the file indicator or the parent network version indicator is provided in a file name of the delta file.

6. The method of claim 2, further comprising:
   for at least one of the plurality of modifications made to the data file, storing a control file locally on the computing device, wherein the control file includes:
   a first timestamp indicating when the modification was made to the data file, and
   a second timestamp indicating when the first network backup version of the data file was transmitted to the backup server.

7. The method of claim 6, wherein the control file comprises a file name containing the first timestamp, and the control file comprises a file date that is set to the second timestamp.

8. The method of claim 6, wherein the control file comprises:
   a file indicator identifying the data file that the control file relates to, and
   a parent network version indicator identifying the first network backup version of the data file transmitted to the backup server.

9. The method of claim 8, wherein one or more of the file indicator or the parent network version indicator is provided in a file name of the control file.

10. The method of claim 6, wherein prior to transmitting the second network backup version to the backup server, the method further comprises:
    determining if there is a previously-stored control file that has a second timestamp indicating when the first network backup version of the data file was transmitted to the backup server; and
    identifying the control file stored locally on the computing device as the previously-stored control file.

11. The method of claim 1, wherein a current version of the data file, that is present on the computing device at the expiry of the network time interval, is transmitted as the second network backup version to the backup server.

12. The method of claim 1, wherein a plurality of modifications are detected as being made to the data file, each at a different time before the expiry of the network time interval, and wherein the method further comprises:
    repeating the refraining and the storing for each of the plurality of detected modifications,
    wherein, the second network backup version includes the last delta file stored closest in time to the expiry of the network time interval.

13. The method of claim 1, wherein the delta file is deleted after a cleanup time interval, and wherein the cleanup time interval indicates the duration of time that the delta file should remain stored on the computing device prior to being deleted.

14. The method of claim 13, wherein the cleanup time interval is equal to the network time interval.

15. The method of claim 1, wherein the data file comprises an archive indicator that indicates when the data file has been modified, and wherein the monitoring the data file comprises reading the archive indicator.

16. The method of claim 1, further comprising:
    receiving input indicating that a version of the data file corresponding to the detected modification is to be restored;
    retrieving the first network backup version from the backup server;
    reading the delta file; and
    merging the retrieved first network backup version with the read delta file to restore the version of the data file.

17. A computing device for performing continuous backup of a data file, the computing device comprising a processor and a memory storing instructions which, when executed by the processor, cause the processor to:
    transmit, to the backup server, a first network backup version of the data file, the backup server being constantly available to the computing device through an uninterrupted network connection between the computing device and the backup server;
    monitor the data file to detect when a modification has been made to the data file;

when a modification to the data file has been detected, refrain from transmitting backup data associated with the modification until a network time interval expires;

store, locally on the computing device, a delta file corresponding to the modification made to the data file; and upon expiry of the network time interval, transmit a second network backup version of the data file to the backup server, the second network backup version comprising the backup data associated with the modification to the data file.

18. The computing device of claim 17, wherein the processor is further configured to:

receive input indicating that a version of the data file corresponding to the detected modification is to be restored;

retrieve the first network backup version from the backup server;

read the delta file; and merge the retrieved first network backup version with the read delta file to restore the version of the data file.

19. A non-transitory computer readable medium storing instructions for performing continuous backup of a data file on a computing device, wherein the instructions, when executed by a processor of the computing device, cause the processor to:

transmit, to the backup server, a first network backup version of the data file, the backup server being constantly available to the computing device through an uninterrupted network connection between the computing device and the backup server;

monitor the data file to detect when a modification has been made to the data file;

when a modification to the data file has been detected, refrain from transmitting backup data associated with the modification until a network time interval expires;

store, locally on the computing device, a delta file corresponding to the modification made to the data file; and upon expiry of the network time interval, transmit a second network backup version of the data file to the backup server, the second network backup version comprising the backup data associated with the modification to the data file.

20. The computer readable medium of claim 19, wherein the processor is further configured to:

receive input indicating that a version of the data file corresponding to the detected modification is to be restored;

retrieve the first network backup version from the backup server;

read the delta file; and merge the retrieved first network backup version with the read delta file to restore the version of the data file.

* * * * *